Jan. 2, 1923.
W. W. SOUTTER.
ELECTRICALLY HEATED KETTLE AND THE LIKE.
FILED DEC. 22, 1921.
1,441,131.
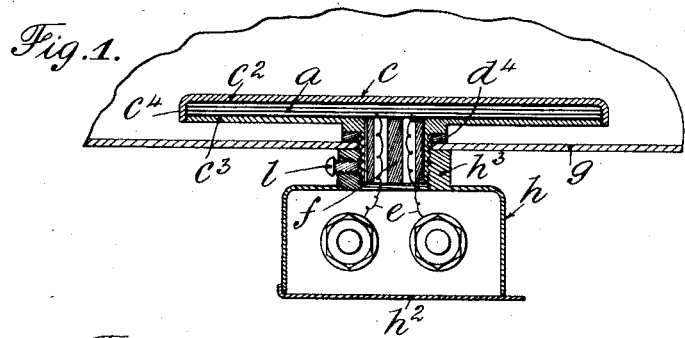
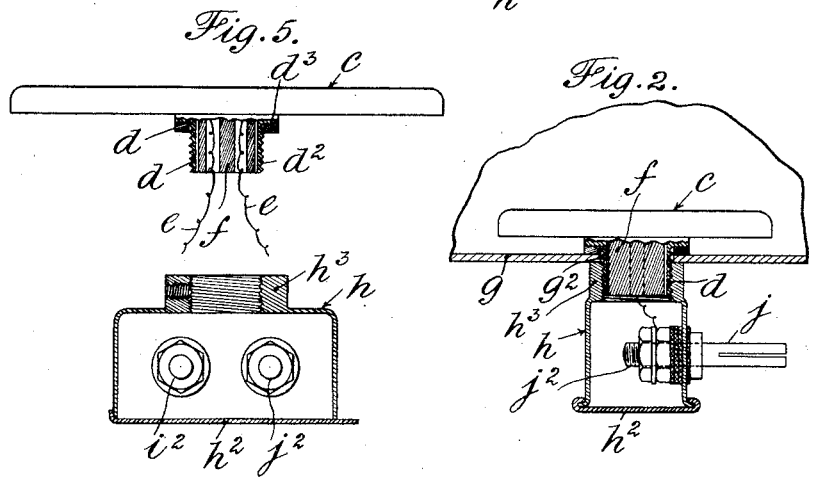
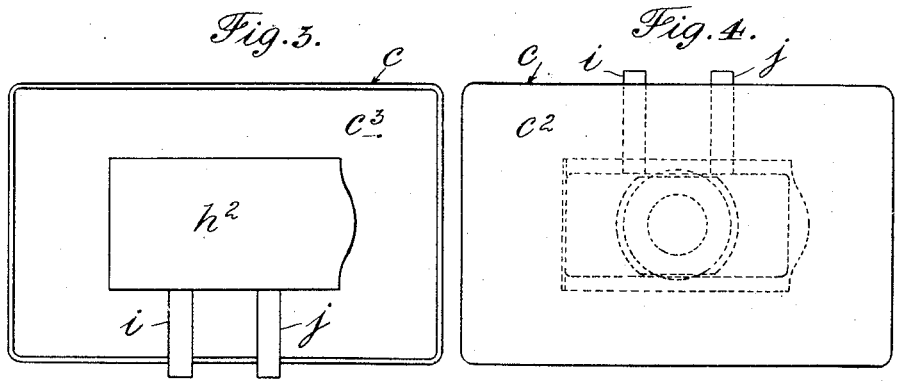
Inventor
Wilfred W. Soutter
By
James L. Norris
Attorney Patented Jan. 2, 1923.

1,441,131

UNITED STATES PATENT OFFICE.

WILFRED WALLIS SOUTTER, OF BIRMINGHAM, ENGLAND.

ELECTRICALLY-HEATED KETTLE AND THE LIKE.

Application filed December 22, 1921. Serial No. 524,225.

*To all whom it may concern:*

Be it known that I, WILFRED WALLIS SOUTTER, subject of the King of Great Britain, residing at Farm Street Copper & Brass Works, Birmingham, England, manufacturer, have invented certain new and useful Improvements in Electrically-Heated Kettles and the like, of which the following is a specification.

The invention relates to an electrically heated kettle or analogous vessel of that kind in which the heating element, disposed within a box, is applied to the interior of the vessel.

In this kind of vessel the invention provides the hereinafter described and claimed improvements whereby the element box is provided with a sleeve to pass through a hole in the wall of the vessel up to a shoulder, to elevate the element box from said wall for free circulation of liquid, and also for the detachable engagement thereof by an outer box for leads and terminals by the application of which outer box said element box is mechanically clamped to the wall of the vessel in an easily renewable manner. The sleeve is preferably externally screw-threaded, and the element box provided with a tubular boss which is internally screw-threaded and adapted to engage the sleeve for the clamping action. Said sleeve is fitted with a porcelain bush through holes of which the leads are threaded, while the outer box preferably has closed sides and ends and a slide-on lid.

The invention is represented by the drawings in a desirable form.

Fig. 1 is a section showing the invention applied to the wall of a vessel.

Fig. 2 is a similar sectional representation at right-angles to Fig. 1.

Fig. 3 is an underside plan of Fig. 1 without the vessel wall.

Fig. 4 is a top-side plan of Fig. 1 without said wall.

Fig. 5 shows a section similar to Fig. 1 of the element box member and the outer box member detached.

The heating element $a$ may be built up in any convenient manner, and is enclosed liquid-tight within a thin metal element box $c$ formed of two plate-like parts $c^2$, $c^3$. One of these parts has a rim $c^4$ to give depth, and both fit together with a soldered-up joint to become one piece and clamp the heating element between them with pressure. The plate-like part $c^3$ is provided with a rigid sleeve, $d$, externally screw-threaded at $d^2$, and with a shoulder $d^3$, and is lined with a porcelain or other bush $f$ through holes of which the leads $e$, $e$ from the element pass. A metal sealing washer $d^4$ is used over the sleeve against the shoulder. Said sleeve is adapted to engage a plain hole $g^2$ in the wall $g$ of the vessel up to the washer which together with the shoulder elevate or distance the element box from the inner surface of the wall of the vessel so that a free circulation of liquid takes place all around the element box which it is understood is positioned within the interior of the vessel.

That part of the sleeve projecting externally of the vessel from the hole $g^2$ is adapted for engagement of a second and outer box $h$ for the leads and terminals. This outer box is a small rectangular structure formed of closed sides and ends and a slide-on lid $h^2$ and rigidly carries an internally screw-threaded boss $h^3$ to engage the sleeve and screw up against the vessel wall with a clamping action fixing the element box within the interior of the vessel and itself to the exterior of the vessel with a watertight joint at the washer. To the one side wall of this outer box the terminal plugs $i$ and $j$ are rigidly secured so that inner ends $i^2$, $j^2$ of them serve for the connection to said plugs of the leads $e$, $e$.

To lock the screw-up clamping action a screw-pin $l$ may be fitted to the boss $h^3$.

The outer box depending from the outer side of the vessel bottom or wall, feet are used to elevate it from the surface on which the vessel rests.

The leads and plug terminals can conveniently be got at within the outer box and the heating element can conveniently be renewed without skilled labour.

Having now described my invention what I claim and desire to secure by Letters Patent is:—

1. An electrically heated kettle or analogous vessel, comprising a vessel wall formed with a hole, an element-containing box provided with a sleeve and a shoulder to engage said hole from the inner side of the vessel up to the shoulder, and an outer box for leads and terminals to engage the sleeve and operate for the mechanical fixing of the element box and itself to opposite sides of the vessel wall, substantially as described.

2. An electrically heated kettle or analogous vessel comprising a vessel wall formed with a hole, an element-containing box provided with a sleeve and a shoulder to engage said hole from the inner side of the vessel up to the shoulder, a porcelain bush lining the sleeve and through holes of which the leads pass, and an outer box for leads and terminals to engage the sleeve and operate for the mechanical fixing of the element box and itself to opposite sides of the vessel wall, substantially as described.

3. An electrically heated kettle or analogous vessel comprising a vessel wall formed with a hole, an element-containing box provided with an externally screw-threaded sleeve and a shoulder to engage said hole from the inner side of the vessel up to the shoulder, and an outer box for leads and terminals to engage the sleeve and operate for the mechanical fixing of the element and itself to opposite sides of the vessel wall, substantially as described.

In testimony whereof I have hereunto set my hand in presence of two subscribing witnesses.

WILFRED WALLIS SOUTTER.

Witnesses:
  JOHN P. FUERY,
  D. LEAKEN.